(No Model.)
R. M. HUNTER.
ELECTRIC MOTOR.
No. 429,094.  Patented May 27, 1890.
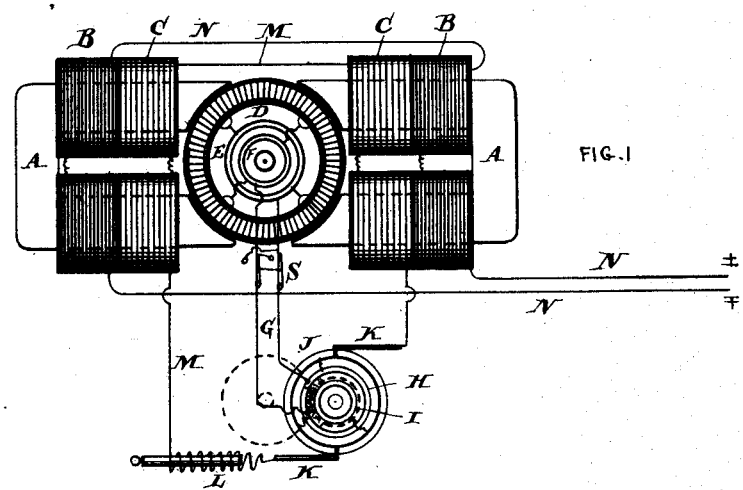
FIG. 1
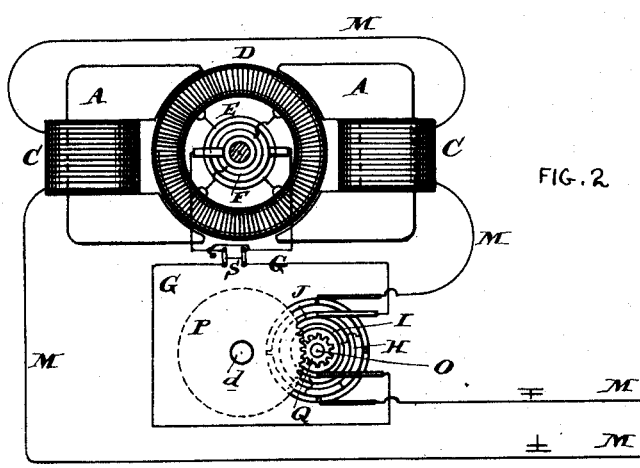
FIG. 2
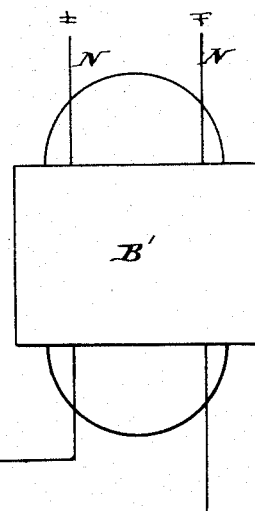
Attest
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC MOTOR.

SPECIFICATION forming part of Letters Patent No. 429,094, dated May 27, 1890.

Application filed November 8, 1889. Serial No. 329,654. (No model.)

*To all whom it may concern:*

Be it known that I, RUDOLPH M. HUNTER, of the city and county of Philadelphia, and State of Pennsylvania, have invented an Improvement in Electric Motors, of which the following is a specification.

My invention has reference to alternating-current motors; and it consists of certain improvements, all of which are fully set forth in the following specification and shown in the accompanying drawings, which form part thereof.

This application (Case 121) embodies an invention in electric motors in which alternating currents or those of alternately increasing and decreasing potential are employed as the energizing medium.

In carrying out my invention I provide the electric motor with field-magnets having one or more poles, and preferably at least four poles arranged equidistant about the armature, and so that when one has the positive sign the adjacent poles have the negative sign, and vice versa. The armature is preferably wound with a continuous coil like a Gramme ring, and so wound that it has a number of poles which are a multiple of the poles of the field. The current is supplied to the armature-coils after passing through the field-coils, and is commutated so that the poles of the armature shall always be such as to produce a rotation in the armature in a given direction. The current passing through the armature is an induced current, and may be generated in the field-coils of the motor or in a separate secondary generator or induction-coil exterior to the motor and receiving the line-current. I may employ the commutator on the same shaft with the armature, or it may be arranged upon a separate shaft and rotated at a greater speed than the armature-shaft, so as to employ a two-part commutator for the multipolar field.

In the drawings, Figure 1 is a diagrammatic view illustrating one type of my improved motor, and Fig. 2 is a similar view of a modification of the same.

Referring to Fig. 1, A A are two horseshoe field-magnets, which may be composed of layers of flat sheet metal, such as commonly employed in secondary generators, and these field-cores present four poles arranged at equal distances about the axis of the armature. Upon these field-magnet cores are arranged fine-wire coils B, which are in circuit with the line N, and coarse-wire coils C, which are in circuit with the armature D through circuits M and G. The armature is wound like a Gramme ring, and the coils are connected at four equal distances apart alternately to two continuous rings E and F. These rings E and F are connected by the circuit G to two other rings H and I, which in turn are respectively connected with the sections of the commutator J, of which there may be two sections or a multiple of two.

K are commutator-brushes connected with the terminals of the circuit M.

L is a regulator in the circuit M for varying the current in the armature-circuit.

It will now be understood that as a high-tension line-current passes through the motor-coils B by line-circuit N induced currents will be set up in the coarse-wire coil C, and these currents will be conveyed by the conductors M through the commutator J and conductor G to the rings E and F and thence to the coils of the armature, producing poles of a polarity such as to induce a rotation constantly in the same direction. A switch S may be employed to reverse the current in the armature, and thereby induce a rotation in the opposite direction when required. It will be observed that the reversals of the induced current in the armature-circuit are in accordance with the reversals of the line-current in the field-magnet, and it is simply necessary to reverse the current in the armature just as its poles pass into the center of the field-poles, so that each pole of the armature is first attracted and then repelled by each pole of the field-magnet without regard to the number of reversals in the current per second.

It is quite evident that the commutator J might be arranged directly upon the shaft of the armature, but in that case it would be necessary for the commutator to have a number of sections corresponding to the subdivisions of the armature. The construction of the commutator where there was a large number of field-magnet poles would in that case become more or less complicated, for they would either have to connect the alternate sections or use a multiplicity of brushes. To overcome this and use only two brushes and less commutator-sections, I prefer to arrange the commutator-rings H and I upon a separate shaft O, and rotate said shaft by means of a spur-gear P upon the armature-shaft $d$, meshing with the pinion Q upon the commutator-shaft. (See Fig. 2.) The proportion between the gears P and Q would be such that every time the poles of the armature come exactly in front of the field-poles the commutator will reverse the current flowing in the armature relatively to the current flowing in the field-coils.

Referring to Fig. 2, we have the current in a circuit M generated by the secondary coil of the secondary generator, whose primary or fine-wire coil B' is in circuit with the line M. This is equivalent to removing the coils B from the field-magnets A, and also part of the coils C therefrom, and including them in a secondary generator exterior to the motor proper.

I do not limit myself to the mere details of construction, as they may be modified in various ways without in the least departing from the spirit of my invention.

Having thus described my invention, what I claim, and desire to secure by Letters Patent, is—

1. In an alternating-current motor, the combination of field-magnets having coils through which an induced current flows, an armature having poles corresponding to the field-magnets and being wound with continuous coils so as to form poles, circuits including the coils of the armature and field magnets, and a commutator having greater speed than the armature-shaft to cause a relative reversal of the current in the armature and field coils at every time the poles of the armature come into line with the poles of the field-magnets.

2. In an alternating-current motor, the combination of field-magnets having coils through which an induced current flows, an armature having poles corresponding to the field-magnets and being wound with coils to form poles, circuits including the coils of the armature and field magnets, a commutator having greater speed than the armature-shaft to cause a relative reversal of the current in the armature and field coils at every time the poles of the armature come into line with the poles of the field-magnets, a line-circuit, and induction-coils having their fine wire in circuit with the line and their coarse wire in circuit with the armature.

3. In an alternating-current motor, the combination of field-magnets having coils through which the induced current flows, an armature having poles corresponding to the field-magnets and being wound with continuous coils, circuits including the coils of the armature and field magnets, and a commutator apparatus to cause a relative reversal of the current in the armature and field coils at every time the poles of the armature come into line with the poles of the field-magnets, consisting of a commutator having a less number of sections than poles on the armature, connected electrically with the coils of the armature and mechanically driven at a greater speed than the armature-shaft.

4. In an alternating-current motor, the combination of field-magnets having coils through which the induced current flows, an armature having poles corresponding to the poles of the magnets and being wound with coils, circuits including the coils of the armature and field magnets, and a commutator device to cause a relative reversal of the current in the armature and field coils at every time the poles of the armature come into line with the poles of the field-magnets, consisting of a commutator having a less number of sections than poles on the armature and connected electrically with the coils of the armature by a series of rings, connecting circuits and brushes, and mechanical driving mechanism for driving the commutator at a greater speed than the armature-shaft.

5. In an alternating-current motor, the combination of field-magnets having coils through which an induced current flows, an armature having poles corresponding to the field-magnets and being wound with a series of coils coupled in multiple circuits including the coils of the armature and field magnets, a commutator to cause a relative reversal of the current in the armature and field coils at every time the poles of the armature come into line with the poles of the field-magnets, and a reversing-switch to reverse the current in the armature located between the commutator and armature-coils.

6. In an alternating-current motor, the combination of field-magnets having coils through which an induced current flows, an armature having poles corresponding to the field-magnets and being wound with coils, circuits including the coils of the armature and field magnets, a commutator to cause a relative reversal of the current in the armature and field coils at every time the poles of the armature come into line with the poles of the field-magnets, and a reversing-switch to reverse the current in the armature located at a point between the armature-coils and commutator.

7. In an alternating-current motor, the combination of field-magnet cores, fine and coarse wire coils wound upon said cores, a line-circuit including the fine-wire coils, an armature wound with coils and having a number of poles corresponding to the field-magnets, a circuit including the coarse-wire coils of the field-magnets and the armature, and a commutator actuated by the armature to cause a relative reversal of the current in the armature and field magnets upon the poles of the armature coming in line with the poles of the field-magnets.

8. In an alternating electric motor, the combination of field-magnet cores, fine and coarse wire coils wound upon said cores, a line-circuit including the fine-wire coils, an armature wound with coils and having a number of poles corresponding to the field-magnets, a circuit including the coarse-wire coils of the field-magnets and the armature, a commutator actuated by the armature to cause a relative reversal of the current in the armature and field magnets upon the poles of the armature coming in line with the poles of the field-magnets, and a regulator to control the current flowing through the armature independent of the current in the line.

9. In an electric motor, the combination of field-magnets and armature, each provided with coils, a commutator having a less number of segments than there are coils upon the armature, connecting power-transmitting gearing between the armature-shaft and the commutator for rotating the commutator at a greater speed than the armature, and connecting-circuits between the field-magnet coils and the armature-coils.

10. In an electric motor, the combination of field-magnets and armature, each provided with coils, a commutator having a less number of segments than there are coils upon the armature, connecting power-transmitting gearing between the armature-shaft and the commutator for rotating the commutator at a greater speed than the armature, connecting-circuits between the field-magnet coils and the armature-coils, and a reversing-switch arranged between the field-coils and the commutator for reversing the current in the armature when reversing the motor.

11. In an electric motor, the combination of multipolar field-magnets, coils upon said field-magnets, an armature having a series of coils and fixed poles upon its circumference and in which the coils are coupled in multiple in fixed relation, whereby said poles correspond in number to the poles of the field-magnets, circuits including the field-coils in series with the armature-coils, a commutator to reverse the current in the armature relatively to the field as many times in a revolution as there are field-magnet poles, and induction apparatus energized by alternating currents in the line-circuit for producing alternating currents in the circuit including the field-coils and armature-coils.

In testimony of which invention I hereunto set my hand.

RUDOLPH M. HUNTER.

Witnesses:
ERNEST HOWARD HUNTER,
S. T. YERKES.